Patented Mar. 28, 1933

1,903,187

UNITED STATES PATENT OFFICE

FRANCIS M. McCLENAHAN, OF MONMOUTH, ILLINOIS

PREPARED SILICA AND PROCESS OF MAKING SAME

No Drawing.  Application filed September 16, 1929. Serial No. 393,122.

This invention relates to prepared silica and the process whereby it is obtained and, more particularly, to the treatment of silica to increase its adsorbent properties.

One of the primary objects of the invention is to provide a simple and effective method for preparing silica in such finely divided condition that its absorbent powers are vastly increased. Another object of the invention is to provide means by which by-products of a former process may be cheaply and effectively converted into silica of such minute size, shape and other qualities as will enhance its adsorbent properties.

Other objects and advantages will appear as the description proceeds.

In the process described in my Patent, No. 1,426,890, for the recovery of metals from silicates, it will be observed that one of the products of the treatment of the silicates is ammonium-fluosilicate. This water soluble material carries all of the silica of the original silicate into solution. To recover both the ammonium and the fluorine, the following reaction is employed:—

$$(NH_4)_2SiF_6 + 4NH_4OH = 6NH_4F + H_4SiO_4.$$

Preferably, an excess of ammonium-hydroxide is employed in the precipitation of the silicic acid, although a large excess need not be used. The heat conditions of the reaction regulate largely the type of precipitated silicic acid. If the temperature is held below about 57° C., the precipitated silicic acid is fairly readily washed free of the adhering ammonium-fluoride. On the other hand, if the temperature is raised above 57° C. at the time of the addition of the ammonium-hydroxide, an opalescent precipitate is produced, which opalescence increases with the elevation of the temperature.

The opalescent product obtained when the temperature is raised above 57° C. is not cleared of ammonium salts as readily as is the former-mentioned product—precipitated silicic acid. While the optimum heat conditions for this reaction seem to be between 65° and 70° C., the reaction has been carried out at temperatures ranging from 57° to 90° C. The mixture is preferably stirred in order to complete precipitation. Washing by decantation has been found to be successful, and the precipitate is susceptible to countercurrent cataract washing for removing the adhering ammonium-fluoride.

The net result of the washing of the opalescent product described above is a colloidal precipitate which carries in its agglomeration a large amount of water. The precipitate may be dried by any desirable means, such as, for example, steam heated or flame heated air current. Preferably, the temperatures should not be elevated far above that required for the evaporation of the water occluded or otherwise combined with the silicic acid. It has been found that this produces a dried product of approximately 23% water content. This product has been found to possess valuable properties, particularly for the adsorption of materials.

The dried product is preferably further treated by quickly heating to a temperature at which a large proportion of its water content is driven off. The quick heating of the particles to a temperature approaching dull redness, as, for example, to from 500° to 700° C., has been found to explode or break up the particles into fragments of extremely fine mesh. The fragments or balls formed from the exploded silica that has been precipitated under the above optimum conditions seem to be approximately of diameters ranging from 1/200th mm., or less, to 1/2000th mm., or more. These fragments may be further subdivided by similar treatment to form fragments of much smaller diameter.

It will be observed that the breaking up of the silica into very finely divided particles vastly increases the surface area of the material and hence its adsorptive properties, and the product of the process, is therefore particularly well adapted for the refinement of liquids, such as, for example, hydrocarbon oils.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. A process of treating ammonium-silico-fluoride, comprising adding ammonium-hydroxide to a water solution of ammonium-silico-fluoride, precipitating silicic acid, and quickly furnacing said precipitated product not substantially below 500° C.

2. A process for preparing silica from ammonium-silico-fluoride, comprising adding ammonium-hydroxide to a water solution of ammonium-silico-fluoride, precipitating silica, washing said precipitate, and quickly furnacing the washed precipitate not substantially below 500° C.

3. A process for preparing silica from ammonium-silico-fluoride, comprising adding ammonium-hydroxide to a water solution of ammonium-silico-fluoride, precipitating silica, washing said precipitate, and quickly heating the washed precipitate to a temperature above about 500° C.

4. A process of preparing silica, comprising adding ammonium-hydroxide to a water solution of ammonium-silico-fluoride at a temperature that will cause the silicic acid to be precipitated in an opalescent form when moist, stirring the mixture to complete the precipitation, filtering and washing the precipitated silicic acid to free the same from adhering salts, drying said silicic acid at a temperature that will produce a dried product, and quickly furnacing the dried product at a temperature not substantially below 500° C.

5. A process for obtaining finely divided silica, comprising adding ammonium-hydroxide to a water solution of ammonium-silico-fluoride, maintaining the temperature during the reaction above about 57° C. to produce an opalescent colloidal precipitate, washing the precipitate, and quickly heating the precipitate to a temperature above about 500° C.

6. A process for preparing silica from ammonium-silico-fluoride, comprising adding ammonium-hydroxide to a water solution of ammonium-silico-fluoride, precipitating silica, washing said precipitate, drying the precipitate, and quickly heating it to a temperature not substantially below 500° C.

In testimony whereof, I have hereunto set my hand this 13th day of September, 1929.

FRANCIS M. McCLENAHAN.